United States Patent
Patel et al.

(10) Patent No.: US 10,677,883 B2
(45) Date of Patent: Jun. 9, 2020

(54) SYSTEM AND METHOD FOR AUTOMATING BEACON LOCATION MAP GENERATION USING SENSOR FUSION AND SIMULTANEOUS LOCALIZATION AND MAPPING

(71) Applicant: FUJI XEROX CO., LTD., Tokyo (JP)

(72) Inventors: Miteshkumar Patel, San Jose, CA (US); Maani Ghaffari Jadidi, Sidney (AU); Jacob Biehl, San Jose, CA (US); Andreas Girgensohn, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 100 days.

(21) Appl. No.: 15/586,234

(22) Filed: May 3, 2017

(65) Prior Publication Data
US 2018/0321353 A1 Nov. 8, 2018

(51) Int. Cl.
*G01S 5/04* (2006.01)
*H04W 4/02* (2018.01)
(Continued)

(52) U.S. Cl.
CPC .............. *G01S 5/04* (2013.01); *G01C 21/165* (2013.01); *G01C 21/206* (2013.01);
(Continued)

(58) Field of Classification Search
CPC ........ H04W 4/028; H04W 4/029; H04W 4/04
See application file for complete search history.

(56) References Cited

U.S. PATENT DOCUMENTS

2015/0289111 A1* 10/2015 Ozkan ............... H04W 4/40 455/456.1
2015/0334676 A1* 11/2015 Hart ................... H04W 4/029 455/456.1
(Continued)

OTHER PUBLICATIONS

C. Forster, L. Carlone, F. Dellaert, and D. Scaramuzza, "IMU Preintegration on Manifold for Efficient Visual-Inertial Maximum-a-Posteriori Estimation," in Robotics: Science and Systems XI, Sapienza University of Rome, Rome, Italy, Jul. 13-17, 2015, 2015.
(Continued)

*Primary Examiner* — Wen W Huang
(74) *Attorney, Agent, or Firm* — Procopio, Cory, Hargreaves & Savitch LLP

(57) ABSTRACT

A system and method, which utilizes incremental smoothing and mapping (iSAM) algorithm and automatically builds a beacon location map using various sensor and environmental information. The aforesaid iSAM algorithm fuses received signal strength indicator (RSSI) values available from different beacons in the environment and the information provided by the IMU sensor. The aforesaid iSAM algorithm is capable of simultaneously generating beacon and landmark map and localize the mobile computing device in the environment without having any prior information about any beacon locations. To accommodate for noisy sensor data and achieve better convergence for the iSAM algorithm, the system uses a prior beacon location map, which contains location information of some of the BLE beacons located in the environment. These known beacon locations provide cleaner environmental information to the iSAM algorithm and hence improve the overall estimation of beacon locations, which were not available apriori.

20 Claims, 6 Drawing Sheets

(51) Int. Cl.
G01C 21/16 (2006.01)
H04W 4/80 (2018.01)
H04B 17/318 (2015.01)
H04W 4/029 (2018.01)
G01C 21/20 (2006.01)
G09B 29/10 (2006.01)

(52) U.S. Cl.
CPC ............ *H04B 17/318* (2015.01); *H04W 4/02* (2013.01); *H04W 4/029* (2018.02); *H04W 4/80* (2018.02); *G09B 29/10* (2013.01)

(56) References Cited

U.S. PATENT DOCUMENTS

| | | | | |
|---|---|---|---|---|
| 2017/0064667 | A1* | 3/2017 | Mycek | H04B 17/318 |
| 2017/0219359 | A1* | 8/2017 | Elhoushi | G01C 21/206 |
| 2018/0067187 | A1* | 3/2018 | Oh | H04W 64/00 |
| 2018/0180706 | A1* | 6/2018 | Li | H04W 4/029 |
| 2018/0279067 | A1* | 9/2018 | Ivanov | H04B 17/318 |
| 2018/0332369 | A1* | 11/2018 | Jadidi | H04Q 9/00 |

OTHER PUBLICATIONS

Y. Gu, A. Lo, and I. Niemegeers, "A survey of indoor positioning systems for wireless personal networks," IEEE Commun. Surv. Tutor., vol. 11, No. 1, pp. 13-32, First 2009.

I. Vallivaara, J. Haverinen, A. Kemppainen, and J. Röning, "Magnetic field-based SLAM method for solving the localization problem in mobile robot floor-cleaning task," in 2011 15th International Conference on Advanced Robotics (ICAR), 2011, pp. 198-203.

F. Li, C. Zhao, G. Ding, J. Gong, C. Liu, and F. Zhao, "A Reliable and Accurate Indoor Localization Method Using Phone Inertial Sensors," in Proceedings of the 2012 ACM Conference on Ubiquitous Computing, New York, NY, USA, 2012, pp. 421-430.

"Robotics Institute: Wifi localization and navigation for autonomous indoor mobile robots." [Online]. Available: http://www.ri.cmu.edu/publication_view.html?pub_id=6819. [Accessed: Jan. 25, 2017].

N. Ravi, P. Shankar, A. Frankel, A. Elgammal, and L. Iftode, "Indoor Localization Using Camera Phones," in Seventh IEEE Workshop on Mobile Computing Systems Applications (WMCSA'06 Supplement), 2006, pp. 49-49.

P. Mirowski, T. K. Ho, S. Yi, and M. MacDonald, "SignalSLAM: Simultaneous localization and mapping with mixed WiFi, Bluetooth, LTE and magnetic signals," in International Conference on Indoor Positioning and Indoor Navigation, 2013, pp. 1-10.

S. O. Madgwick, "An efficient orientation filter for inertial and inertial/magnetic sensor arrays," Rep. X-lo Univ. Bristol UK, 2010.

"Friis Free Space Propagation Model," GaussianWaves, Sep. 27, 2013.

M. Kaess, A. Ranganathan, and F. Dellaert, "iSAM: Incremental Smoothing and Mapping," IEEE Trans. Robot., vol. 24, No. 6, pp. 1365-1378, Dec. 2008.

H. Durrant-Whyte and T. Bailey, "Simultaneous localization and mapping: part I," IEEE Robot. Autom. Mag., vol. 13, No. 2, pp. 99-110, Jun. 2006.

M. Montemerlo, S. Thrun, D. Koller, and B. Wegbreit, "FastSLAM: A Factored Solution to the Simultaneous Localization and Mapping Problem," in Eighteenth National Conference on Artificial Intelligence, Menlo Park, CA, USA, 2002, pp. 593-598.

S. Thrun and M. Montemerlo, "The Graph SLAM Algorithm with Applications to Large-Scale Mapping of Urban Structures," Int. J. Robot. Res., vol. 25, No. 5-6, pp. 403-429, May 2006.

S. Leutenegger, S. Lynen, M. Bosse, R. Siegwart, and P. Furgale, "Keyframe-based visual-inertial odometry using nonlinear optimization," Int. J. Robot. Res., vol. 34, No. 3, pp. 314-334, Mar. 2015.

Y. Shi, S. Ji, Z. Shi, Y. Duan, and R. Shibasaki, "GPS-Supported Visual SLAM with a Rigorous Sensor Model for a Panoramic Camera in Outdoor Environments," Sensors, vol. 13, No. 1, pp. 119-136, Dec. 2012.

L. Géneve, O. Kermorgant, and É. Laroche, "A composite beacon initialization for EKF range-only SLAM," in 2015 IEEE/RSJ International Conference on Intelligent Robots and Systems (IROS), 2015, pp. 1342-1348.

Indoo.rs, "indoo.rs-SLAM," indoo.rs SLAM Revolution, Feb. 20, 2017.

J. Huang, D. Millman, M. Quigley, D. Stavens, S. Thrun, and A. Aggarwal, "Efficient, generalized indoor WiFi GraphSLAM," in 2011 IEEE International Conference on Robotics and Automation, 2011, pp. 1038-1043.

* cited by examiner

SYSTEM AND METHOD FOR AUTOMATING BEACON LOCATION MAP GENERATION USING SENSOR FUSION AND SIMULTANEOUS LOCALIZATION AND MAPPING

BACKGROUND OF THE INVENTION

Technical Field

The disclosed embodiments relate in general to localization and tracking systems and methods and, more specifically, to system and method for automating beacon location map generation using sensor fusion and simultaneous localization and mapping.

Description of the Related Art

The spreading of personal communication systems into many public and private places, as well as the onset of new generation of smartphones, has enabled the development of a vast number of indoor positioning systems based on standard wireless communication technologies as described, for example, in Y. Gu, A. Lo, and I. Niemegeers, "A survey of indoor positioning systems for wireless personal networks," *IEEE Commun. Surv. Tutor.*, vol. 11, no. 1, pp. 13-32, First 2009. Various localization techniques have been developed and experimented using variety of sensors such as magnetometer, described, for example, in I. Vallivaara, J. Haverinen, A. Kemppainen, and J. Röning, "Magnetic field-based SLAM method for solving the localization problem in mobile robot floor-cleaning task," in 2011 15*th International Conference on Advanced Robotics (ICAR)*, 2011, pp. 198-203, inertial measurement unit (IMU) is described, for example, in F. Li, C. Zhao, G. Ding, J. Gong, C. Liu, and F. Zhao, "A Reliable and Accurate Indoor Localization Method Using Phone Inertial Sensors," in *Proceedings of the* 2012 *ACM Conference on Ubiquitous Computing*, New York, N.Y., USA, 2012, pp. 421-430, radio frequency sensors (WiFi or Bluetooth low energy (BLE)) described in "Robotics Institute: Wifi localization and navigation for autonomous indoor mobile robots." [Online]. Available: www.ri.cmu.edu/publication_view.html?pub_id=6819, imaging sensors described in N. Ravi, P. Shankar, A. Frankel, A. Elgammal, and L. Iftode, "Indoor Localization Using Camera Phones," in *Seventh IEEE Workshop on Mobile Computing Systems Applications (WMCSA'06 Supplement)*, 2006, pp. 49-49 as well as a fusion of these sensors as described in P. Mirowski, T. K. Ho, S. Yi, and M. MacDonald, "SignalSLAM: Simultaneous localization and mapping with mixed WiFi, Bluetooth, LTE and magnetic signals," in International Conference on Indoor Positioning and Indoor Navigation, 2013, pp. 1-10. Each of the above sensors has its own limitation in terms of noise, sampling rate, characteristics and/or dimensionality. Further, each of these technologies has different requirements such as signature, mapping the environment or generating location map of sensors deployed in a given environment. This introduces new challenges when such technologies are deployed at scale as it requires the manual labor of not only deploying the sensor but also generating a location map of those deployed sensor.

As would be appreciated by persons of ordinary skill in the art, generating beacons map is a very manual and tedious process, which requires manual efforts in terms of placing the beacons and taking measurements of each of these beacon locations in a given environment. This presents a great challenge in scaling of the beacon localization and tracking technology.

Therefore, in view of the aforesaid limitations of the conventional technology, new and improved systems and methods are needed for generating a beacon location map for indoor localization and tracking applications.

SUMMARY OF THE INVENTION

The embodiments described herein are directed to methods and systems that substantially obviate one or more of the above and other problems associated with conventional localization and tracking systems.

In accordance with one aspect of the inventive concepts described herein, there is provided a computer-implemented method, the method being performed in a computerized system incorporating a central processing unit, a localization signal receiver, a plurality of sensors, separate and distinct from the localization signal receiver, and a memory, the computer-implemented method involving: receiving a plurality of localization signals corresponding to a plurality of localization signal sources using the localization signal receiver; obtaining a plurality of sensor readings using the plurality of sensors; and determining a location of each of the plurality of localization signal sources based on the received localization signal and the obtained plurality of sensor readings.

In one or more embodiments, the localization signal receiver is a Bluetooth receiver and wherein the localization signal sources are Bluetooth low energy (BLE) beacons.

In one or more embodiments, the localization signal receiver is a radiofrequency receiver and wherein the localization signal sources are radiofrequency sources.

In one or more embodiments, determining the location of each of the plurality of localization signal sources comprises dynamically updating the location of each of the plurality of localization signal sources using an iterative smoothing and mapping algorithm (iSAM).

In one or more embodiments, determining the location of each of the plurality of localization signal sources comprises generating a smoothened trajectory data.

In one or more embodiments, the plurality of sensor readings comprises magnetometer data.

In one or more embodiments, the plurality of sensor readings comprises acceleration data.

In one or more embodiments, the plurality of sensor readings comprises a three-dimensional spatial orientation data.

In one or more embodiments, the method further comprises calculating an orientation of the computerized system using an attitude and heading reference system (AHRS) algorithm performed on at least some of the plurality of sensor readings.

In one or more embodiments, the plurality of sensors are incorporated into an inertial measurement unit (IMU).

In one or more embodiments, determining the location of each of the plurality of localization signal sources comprises continuously executing a particle filter and continuously dynamically updating bias parameters for the plurality of sensors and the location of each of the plurality of localization signal sources.

In one or more embodiments, continuously executing the particle filter comprises performing a motion update, performing a measurement update and resampling a plurality of particles.

In one or more embodiments, the measurement update comprises calculating a distance between each of a plurality of particles and at least one localization signal source based on the received localization signal.

In one or more embodiments, performing the measurement update comprises updating a plurality of particles using a confidence of a classifier.

In one or more embodiments, resampling the plurality of particles comprises calculating a weight for each of a plurality of particles and replicating particles of the plurality of particles with higher weights.

In one or more embodiments, determining the location of each of the plurality of localization signal sources comprises using prior information on locations of at least some of the plurality of localization signal sources.

In accordance with another aspect of the inventive concepts described herein, there is provided a non-transitory computer-readable medium embodying a set of computer-executable instructions, which, when executed in connection with a system incorporating a central processing unit, a Bluetooth localization signal receiver, a plurality of sensors, separate and distinct from the Bluetooth localization signal receiver, and a memory, cause the system to perform a method involving: receiving a plurality of localization signals corresponding to a plurality of localization signal sources using the localization signal receiver; obtaining a plurality of sensor readings using the plurality of sensors; and determining a location of each of the plurality of localization signal sources based on the received localization signal and the obtained plurality of sensor readings.

In accordance with yet another aspect of the inventive concepts described herein, there is provided a computerized system incorporating a central processing unit, a Bluetooth localization signal receiver, a plurality of sensors, separate and distinct from the Bluetooth localization signal receiver, and a memory, the memory storing a set of computer-readable instructions causing the system to perform a method involving: receiving a plurality of localization signals corresponding to a plurality of localization signal sources using the localization signal receiver; obtaining a plurality of sensor readings using the plurality of sensors; and determining a location of each of the plurality of localization signal sources based on the received localization signal and the obtained plurality of sensor readings.

In one or more embodiments, the localization signal receiver is a Bluetooth receiver and wherein the localization signal sources are Bluetooth low energy (BLE) beacons.

In one or more embodiments, the localization signal receiver is a radiofrequency receiver and wherein the localization signal sources are radiofrequency sources.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

Figure 1:
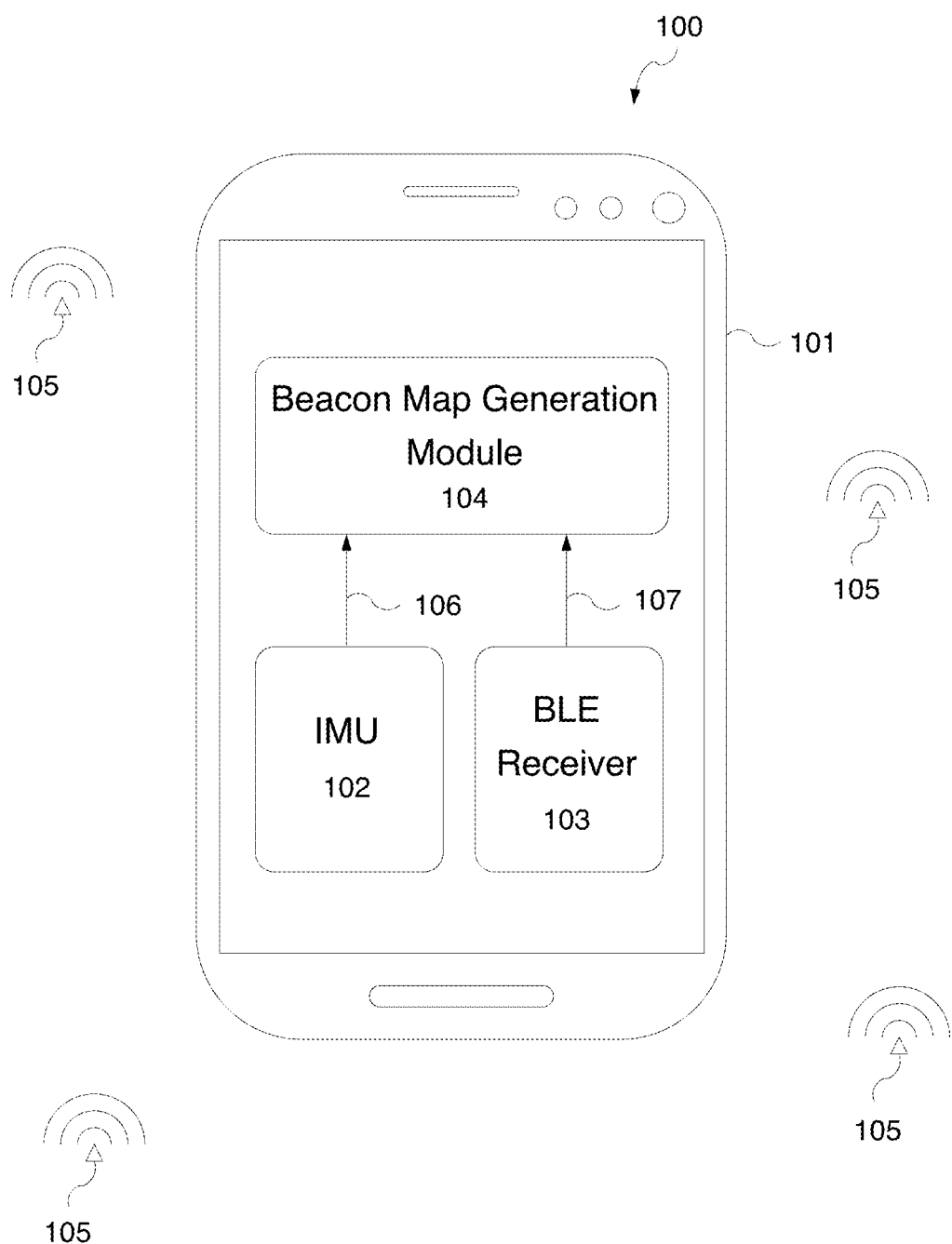
FIG. 1 illustrates an exemplary embodiment of a system based on which the described techniques could be implemented.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The described embodiments are related to systems and methods capable of estimating and updating BLE beacon location map by fusing various sensor data. The described method utilizes iSAM algorithm, which is a variant of the traditional Simultaneous Localization and Mapping (SLAM) algorithm, well known to persons of ordinary skill in the art. The iSAM algorithm utilizes different sensors, which provides environmental and movement information and simultaneously updates both the location of the user's mobile device and the beacon location map, as described, for example, in M. Kaess, A. Ranganathan, and F. Dellaert, "iSAM: Incremental Smoothing and Mapping," *IEEE Trans. Robot.*, vol. 24, no. 6, pp. 1365-1378, December 2008. The environmental information is provided in the form of BLE signal strength, whereas the motion movement of the user's mobile device is available through the IMU sensor.

As would be appreciated by persons of ordinary skill in the art, BLE Received Signal Strength (RSSI) is susceptible to various environmental factors such as reflective surfaces, number of human bodies, obstacles, which leads to multi path issues. This makes the RSSI signal noisy and hence leads to noisy distance measurements. Further, the IMU sensor available on smartphones has its own limitation in form of noisy accelerometer and gyroscope data. Magnetometer data is equally noisy as it is affected by the variations in magnetic fields caused by building infrastructure. The aforesaid noisy sensor data introduces further challenges for the iSAM algorithm and hence makes the BLE beacon location map estimation problem more difficult. To accommodate for noisy sensor data and achieve better convergence for the iSAM algorithm, an embodiment of the described system uses a prior beacon location map, which contains location information of some of the BLE beacons located in the environment. These known beacon locations provide cleaner environmental information to the iSAM algorithm and hence improve the overall estimation of beacon locations, which were not available apriori.

In one or more embodiments, the iSAM algorithm uses the prior beacon location map (available at that time) and fuses it with AHRS (calculated using the IMU sensor) and BLE scans and solves for updating the BLE beacon map with new beacon locations. The iSAM algorithm also updates the previously estimated beacon location. Finally, the updated BLE location map is utilized by a particle filter to estimate the position of the user's mobile device.

The described method is advantageous as it reduces the manual process of measuring the location of every BLE beacon in the environment and reduces it to location measurement of only a small fraction of beacons. For example, if a given environment requires deployment of 200 beacons then, rather than manually measuring location of all 200 beacons, the location measurement can be reduced to only 60 beacons. The location of other 140 beacons can be estimated using the described technique. This reduces the process of measuring BLE location by 70%.

Lastly, another advantage of an embodiment of the described technique is that the described algorithm can leverage on all the BLE devices available in the environment whether owned on not owned by the software application developer. This feature is of great importance as the localization algorithm can use all the possible beacons information available in the environment and leverage that information to localize user's device. This ultimately leads to the improvement in the accuracy of the localization algorithm and also reduces the total number of beacon deployments required in a given environment. For example, if there are BLE beacons deployed by company X, then company Y (software application developer) can install fewer beacons then they initially planned for and build a beacon location map of beacons installed by company X using the described method and use them as part of the localization algorithm.

Therefore, in accordance with one aspect of the embodiments described herein, there is provided a system and method, which utilizes incremental smoothing and mapping (iSAM) algorithm and automatically builds a beacon location map using various sensor and environmental information. In the described embodiment, the aforesaid iSAM algorithm fuses received signal strength indicator (RSSI) values available from different beacons in the environment and the information provided by the IMU sensor. The aforesaid iSAM algorithm, well known to persons of ordinary skill in the art, is capable of simultaneously generating beacon and landmark map and localize the mobile computing device in the environment without having any prior information about any beacon locations. On the other hand, the convergence of the iSAM algorithm is highly dependent on the availability of good sensing of the environment and motion movement of the mobile device of the user.

As would be appreciated by persons of ordinary skill in the art, the sensor information, including the BLE signals and IMU sensor signals, are very noisy in nature, hence the user of such sensors introduces substantial challenges for the iSAM algorithm to correctly plot the beacon location map. The aforesaid BLE signals emitted by different BLE beacons disposed in the surroundings and detected using BLE sensor are heavily impacted by different environmental factors such as reflection of signals from various surfaces as well as presence of human bodies. Similarly, the IMU sensors available on smartphones are very noisy and require constant calibration for reliable performance.

Hence, in order to assist the aforesaid iSAM algorithm in generating a reliable estimate of beacon locations, it is advantageous to provide information related to some of the beacon location in the environment. The aforesaid apriori known beacon locations are used by the iSAM algorithm as anchors. These anchor beacon locations are utilized by the iSAM algorithm along with the BLE scans and the IMU sensor output to estimate and update the locations of beacons not known apriori.

FIG. 1 illustrates an exemplary embodiment of a system 100 based on which the described techniques could be implemented. In one embodiment, the system 100 is implemented based on a mobile device 101 such as a smartphone. The system 100 uses data 106 generated by the IMU sensors 102 and data 107 generated by the BLE receiver 103, both of which are furnished to a BLE beacon map generation module 104 executed by the processor of the mobile device 101. The signal 107 of the BLE receiver 103 corresponds to multiple BLE beacons 105 disposed in the surroundings, such as in different rooms of a building.

The BLE scans consist of radio frequency (RF) signals emitted by different BLE beacons 105 present in the environment. The signal is effected heavily by different environment factors and hence makes the localization problem challenging. Further, as it is known in the art, IMU sensor 102 is a collection of 9-axis sensors, which provides 3-axis linear acceleration and angular velocity form accelerometer and gyroscope, respectively, as well as 3-axis magnetic field. As would be appreciated by persons of ordinary skill in the art, each of these sensors is noisy and hence cannot be used directly to measure the orientation of the device 101 from raw sensor readings. In addition, the measurement bias of these sensors are time-varying and impacted by various factors, including mechanical stress on the sensor, ambient temperature and the misalignment of the sensor at the time of the installation.

Figure 2:
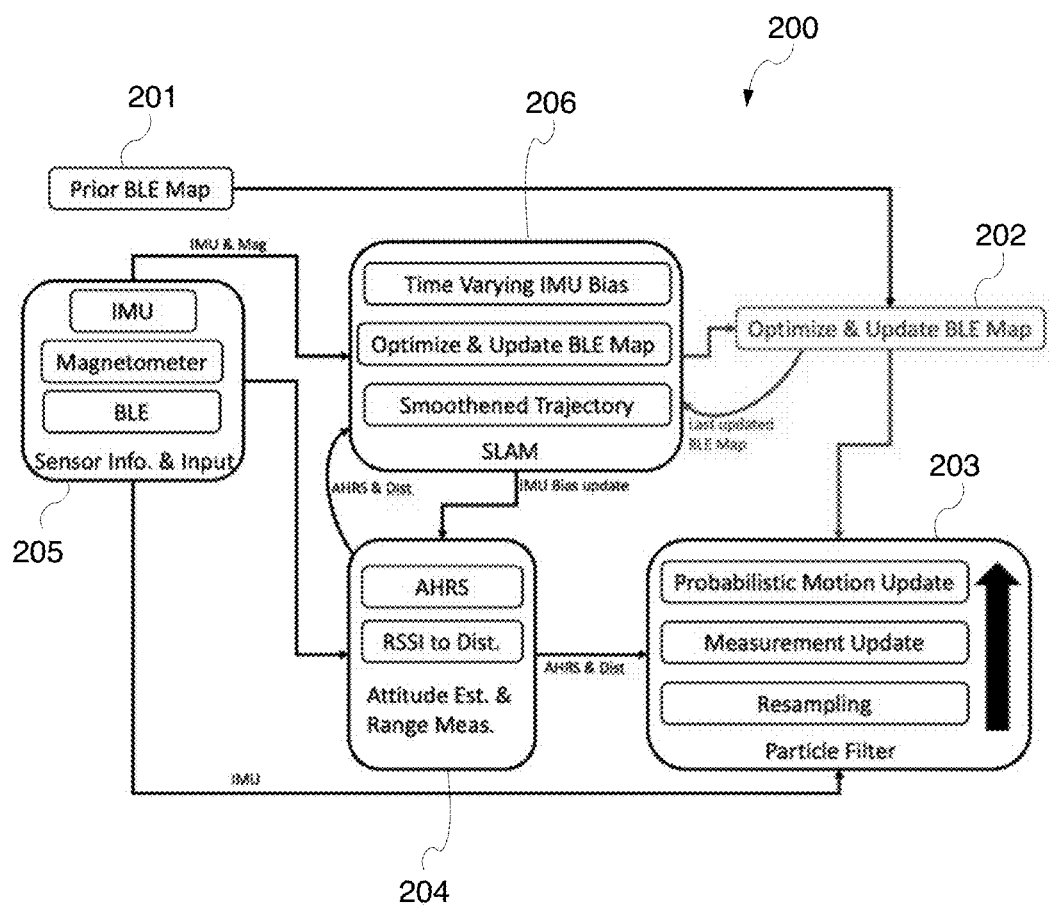
FIG. 2 illustrates an exemplary flow chart of an embodiment of the described system.

FIG. 2 illustrates an exemplary flow chart 200 of an embodiment of the described system 100. The prior BLE Map 201 consists of partial BLE map available at start and is updated as and when new scans from BLE beacons 105 are received. The beacon map is updated using the estimates available from the iSAM module 206 and are further utilized by Particle Filter 203 module to estimate the user location.

The detailed description of the modules shown in FIG. 2 is provided below. The sensor information block 205 provides sensors information available from various sensors sources such as the IMU 102, a magnetometer, which may be integrated with the IMU 102, and the BLE receiver 103. In one or more embodiments, the sampling rate of the IMU 102 and magnetometer is 200 Hz and 50 Hz, respectively, whereas the BLE receiver 103 is scanned at 10 Hz. In another embodiment, the minimum sampling rate of IMU and magnetometer is 100 and 25 Hz, respectively, and that for BLE receiver it is 5 Hz. In one or more embodiments, the raw IMU and magnetometer data 106 of all the sensors are smoothened using a median filter.

In one or more embodiments, the prior BLE map 201 incorporates beacon location information of some, but not all, of the beacons 105, which are placed in a given environment. This prior BLE map 201 is used by the iSAM algorithm to optimize, estimate and update the location of new beacons that were not available apriori in the prior BLE map 201, see modules 202 and 206 in FIG. 2.

In one or more embodiments, the attitude estimation and range measurement module 204 calculates the orientation of the mobile device 101, which is performed using attitude and heading reference system (AHRS) algorithm described in detail in S. O. Madgwick, "An efficient orientation filter for inertial and inertial/magnetic sensor arrays," Rep. X-Io Univ. Bristol UK, 2010. In one or more embodiments, the orientation of the mobile device 101 is calculated by fusing both the IMU and the magnetometer sensor data. Further, the RSSI signals received from each BLE beacon are converted to distance using Friis Free Space Model described in detail in "Friis Free Space Propagation Model," *GaussianWaves*, 27 Sep. 2013. In one or more embodiments, the parameters of the model are calibrated for transmission power of +4 dbm for the BLE beacons 105. It should be noted that in one embodiment, the transmission power of all the BLE beacons 105 is set to +4 dbm such that the correct distance measurement is generated using the aforesaid Friis Free Space Model. In one or more embodiments, the BLE signal has transmission power range set from −20 dbm to +4 dbm.

Simultaneous localization and mapping (SLAM) module 206 uses the iSAM algorithm, which is a variant of SLAM algorithm. The iSAM utilizes the orientation calculated by the AHRS, BLE scan data 107, IMU measurements 106 and prior BLE map 201 and solves for an updated BLE beacon location map, IMU bias and device trajectory. The optimized BLE beacon location map is further utilized by the particle filter 203 to update the position of the mobile device of the user.

The particle filter loop 203 utilizes the BLE scan data 107, the mobile device orientation calculated by AHRS the BLE map information and the distance generated by converting from RSSI to update the state of the particles. The position of the user's mobile device is then determined by calculating the weighted mean of all the particles.

In one or more embodiments, the aforesaid Particle Filter loop 203 sequentially processes the sensory information in different steps to estimate the posterior probability distribution of the location of the user handheld device 101. In the first, probabilistic motion update step of the aforesaid Particle Filter loop 203, the system solves for the orientation of the handheld device 101 using the aforesaid AHRS, calculated from the IMU data, and sample data from the IMU to generate particles along the moving direction. In the measurement update step, using range measurements accumulated from the BLE scans, importance weights of particles are computed. This involves first converting received signal strength indicator (RSSI) obtained from the BLE scan to distance to determine the distance between the respective BLE beacons and each particle. Subsequently, particles are updated using the respective confidence classifier. Finally, in the resampling step, particles with higher weights are replicated.

To evaluate the described inventive techniques, IMU sensor data and BLE scan data were collected using a smartphone. The smartphone was mounted on a robot, which was maneuvered in an office space with normal human traffic. The robot provided ground truth data, which was used to cross validate the results. The robot was maneuvered for over 70 m. The IMU and magnetometer sensors were sampled at 200 Hz and 50 Hz, respectively, whereas the BLE scans were sampled at 7 Hz.

To compare the effectiveness of the iSAM algorithm to detect new beacons, which are not currently present in the beacon location map and the overall improvement achieved in the localization using the new beacons we performed two sets of experiments. In the first experiment, the data, which has the BLE scans from only the known beacons available in the beacon location map, was used for localization. In the second experiment the BLE scan data from all the beacons available in the environment was used and the iSAM algorithm was utilized to estimate the location of these unknown beacons and utilize those unknown beacons in the overall localization algorithm.

Figure 3A:
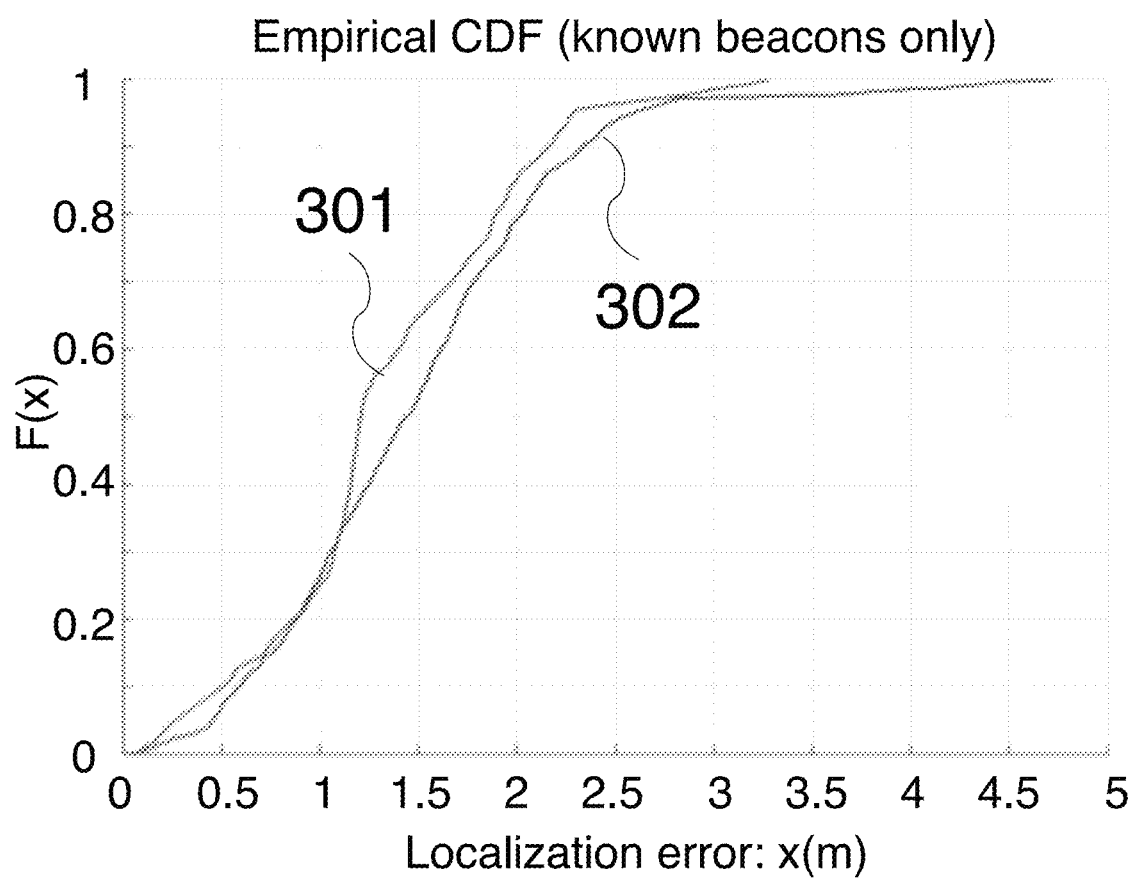
FIG. 3(a) presents the cumulative distribution function (CDF) generated using only the known beacons in the database.
Figure 3B:
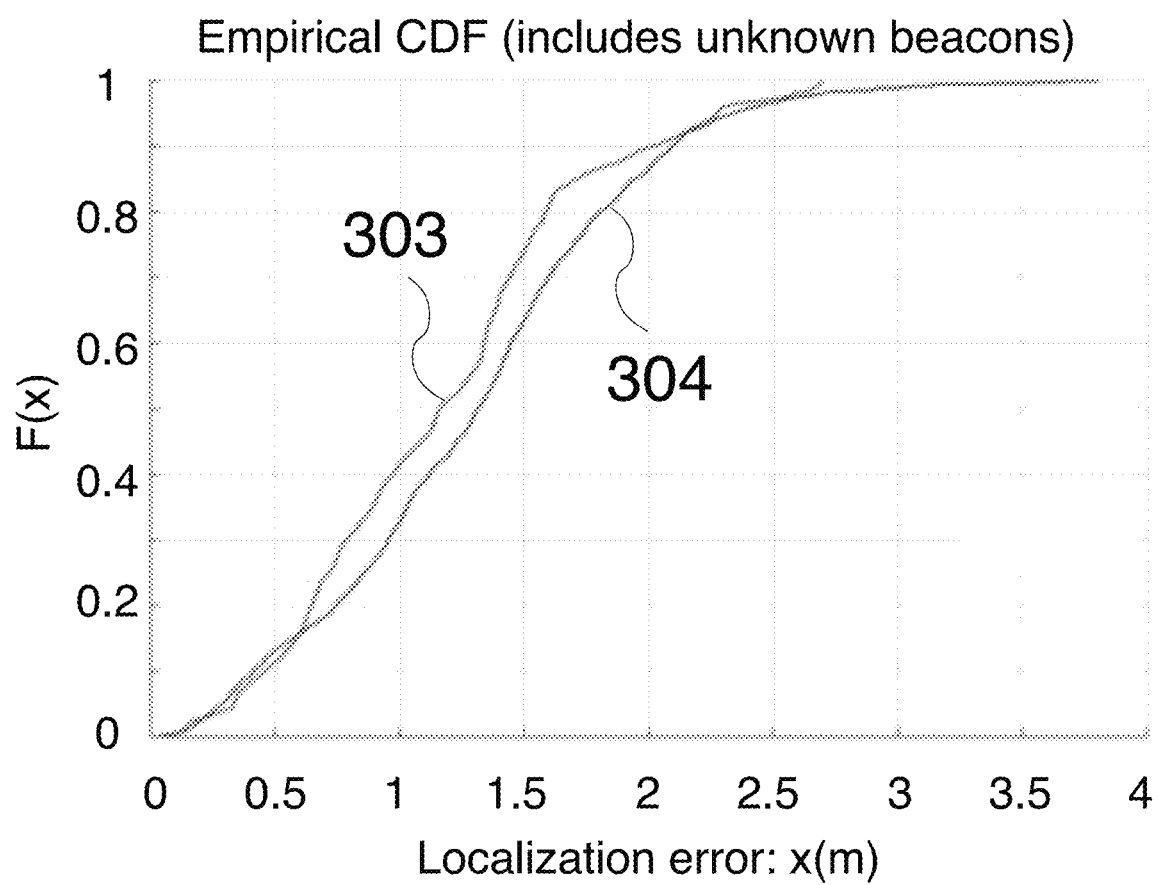
FIG. 3(b) presents CDF generated using the both known and unknown beacons in the database.
Figure 4:
FIG. 4 shows the location of unknown beacon maps estimated by the iSAM algorithm.

The results presented in FIGS. 3(a) and 3(b) reveal that the accuracy of the localization algorithm improves when the unknown beacons are added to the beacon location map. Specifically, FIG. 3(a) presents the cumulative distribution function (CDF) generated using only the known beacons in the database, see curve 302, while FIG. 3(b) presents CDF generated using the both known and unknown beacons in the database, see curve 304. The mean error of the particle filter framework is around 2.4 m for 90% of cases when the BLE scans of only the known beacons in the environment are used, whereas the mean error is reduced to around 2 m for 90% of cases when the BLE scans of all beacons (known and unknown) are utilized. FIG. 4 shows the location of unknown beacon maps estimated by the iSAM algorithm. The location presented in FIG. 4 corresponds to the estimate available after running the iSAM algorithm through the entire dataset.

Computing Platforms

Figure 5:
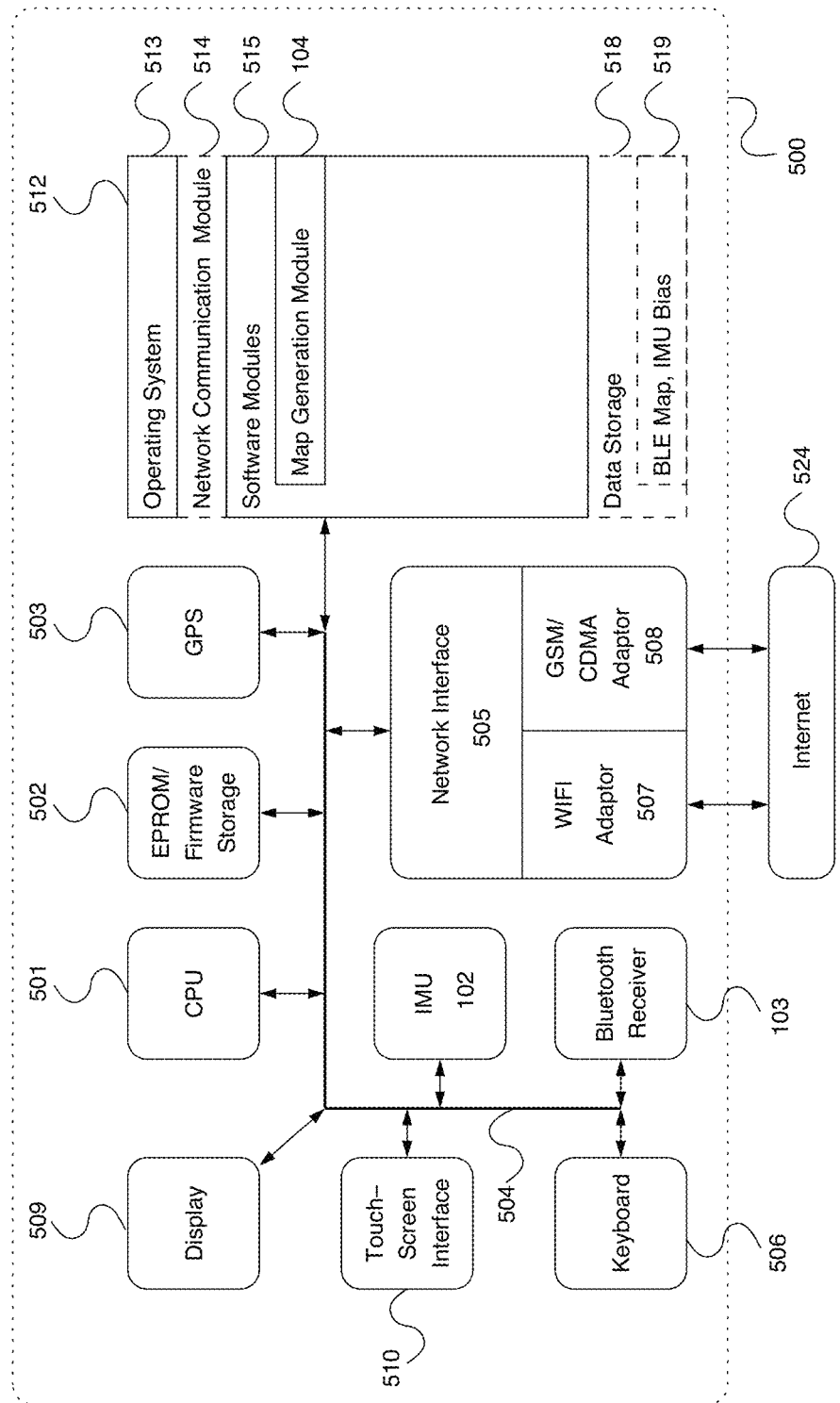
FIG. 5 illustrates an exemplary embodiment of a computerized mobile system that could be used as the handheld client device in connection with the system illustrated in FIG. 1.

FIG. 5 illustrates an exemplary embodiment of a computerized mobile system 500 that could be used as the handheld client device 101 in connection with the system illustrated in FIG. 1. In one or more embodiments, the computerized mobile system 500 may be implemented within a form factor of a mobile computing device, such as a smartphone, a personal digital assistant (PDA), a tablet computer, or a smart watch, all of which are widely available commercially and are well known to persons of skill in the art.

The computerized system 500 may include a data bus 504 or other interconnect or communication mechanism for communicating information across and among various hardware components of the mobile computerized system 500, and a central processing unit (CPU or simply processor) 501 coupled with the data bus 504 for processing information and performing other computational and control tasks. Computerized system 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computerized system 500 may further include a read only memory (ROM or EPROM) 502 or other static storage device coupled to the data bus 504 for storing static information and instructions for the processor 501, such as firmware necessary for the operation of the computerized system 500, basic input-output system (BIOS), as well as various configuration parameters of the computerized system 500.

In one or more embodiments, the computerized system 500 may incorporate a display device 509, which may be also coupled to the data bus 504, for displaying various information to a user of the computerized system 500. In an alternative embodiment, the display device 509 may be associated with a graphics controller and/or graphics processor (not shown). The display device 509 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 509 may be incorporated into the same general enclosure with the remaining components of the computerized system 500. In an alternative embodiment, the display device 509 may be positioned outside of such enclosure.

In one or more embodiments, the computerized system 500 may further incorporate a GPS receiver 503 connected to the data bus 504 and configured to receive location information from one or more GPS satellites and transmit this information to the processor 501 via the data bus 504.

In one or more embodiments, the computerized system 500 may incorporate one or more input devices, such as a touchscreen interface 510 for receiving tactile commands and a keyboard 506, which all may be coupled to the aforesaid data bus 504 for communicating information, including, without limitation, user command selections to the processor 501. In an alternative embodiment, input devices may include a system for tracking eye movements of the user (not shown), which may be used to indicate to the computerized system 500 the command selection by the user.

In one or more embodiments, the computerized system 500 may additionally include a location signal receiver 103, such as a Bluetooth receiver, configured to perform scan for beacons 106 and supply scan data described above to the processor 501 via the data bus 504. In addition, the IMU 102 may be also connected to the data bus 504.

In one or more embodiments, the computerized system 500 may additionally include a communication interface, such as a network interface 505 coupled to the data bus 504. The network interface 505 may be configured to establish a connection between the computerized system 500 and the Internet 524 using at least one of WIFI interface 507 and the cellular network (GSM or CDMA) adaptor 508. The network interface 505 may be configured to provide a two-way data communication between the computerized system 500 and the Internet 524. The WIFI interface 507 may operate in compliance with 802.11a, 802.11b, 802.11g and/or 802.11n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information. For example, the aforesaid networking components may be used to establish a network data connection between the computerized system 500 and other network components.

In one or more embodiments, the Internet 524 typically provides data communication through one or more subnetworks to other network resources. Thus, the computerized system 500 is capable of accessing a variety of network resources located anywhere on the Internet 524, such as web servers, other content servers as well as other network data storage resources. In one or more embodiments, the computerized system 500 is configured send and receive messages, media and other data, including application program code, through a variety of network(s) including Internet 524 by means of the network interface 505. In the Internet example, when the computerized system 500 acts as a network client, it may request code or data for an application program executing on the computerized system 500. Similarly, it may send various data or computer code to other network resources.

In one or more embodiments, the functionality described herein is implemented by computerized system 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computerized system 500 from the foresaid remote computer via the Internet 524 using a variety of network data communication protocols well known in the art.

In one or more embodiments, the memory 512 of the computerized system 500 may store any of the following software programs, applications or modules:

1. Operating system (OS) 513, which may be a mobile operating system for implementing basic system services and managing various hardware components of the computerized system 500. Exemplary embodiments of the operating system 513 are well known to persons of skill in the art, and may include any now known or later developed mobile operating systems.

2. Network communication module 514 for enabling network communications using one or more network interfaces described below.

3. Software modules 515 may include, for example, a set of software applications executed by the processor 501 of the computerized system 500, which cause the computerized mobile system 500 to perform certain predetermined functions, such as receive the beacon signals as described above. In one or more embodiments, the software modules 515 may include, for example, the map generation module 104 shown in FIG. 1.

4. Data storage 518 may be used, for example, for storing the bacon scan data, beacon map and IMU bias data 519.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in systems and methods for automating beacon location map generation using sensor fusion and simultaneous localization and mapping. It is intended that the specification and examples be considered as exemplary only, with a true scope and spirit of the invention being indicated by the following claims.

What is claimed is:

1. A computer-implemented method, the method being performed in a computerized system comprising a central processing unit, a localization signal receiver, a plurality of sensors, separate and distinct from the localization signal receiver, and a memory, the computer-implemented method comprising:
   a. obtaining a map comprising locations of a first plurality of localization signal sources;
   b. receiving a plurality of localization signals corresponding to a second plurality of localization signal sources using the localization signal receiver, the second plurality of localization signal sources comprising the first plurality of localization signal sources and at least one new localization signal source;
   c. obtaining a plurality of sensor readings using the plurality of sensors; and
   d. determining a location of the at least one new localization signal source using the map of locations of the first plurality of localization signal sources, the received localization signals of the second plurality of localization signal sources, and the obtained plurality of sensor readings,
   wherein the determining the location of the at least one new localization signal source comprises continuously executing a particle filter, continuously dynamically updating bias parameters for the plurality of sensors and the location of each of the second plurality of localization signal sources, and generating a smoothened trajectory data for the computerized system.

2. The computer-implemented method of claim 1, wherein the localization signal receiver is a Bluetooth receiver and wherein the localization signal sources are Bluetooth low energy (BLE) beacons.

3. The computer-implemented method of claim 1, wherein the localization signal receiver is a radiofrequency receiver and wherein the localization signal sources are radiofrequency sources.

4. The computer-implemented method of claim 1, wherein determining the location of the at least one new localization signal source comprises dynamically updating the location of each of the second plurality of localization signal sources using an iterative smoothing and mapping algorithm (iSAM).

5. The computer-implemented method of claim 1, wherein the plurality of sensor readings comprises magnetometer data.

6. The computer-implemented method of claim 1, wherein the plurality of sensor readings comprises acceleration data.

7. The computer-implemented method of claim 1, wherein the plurality of sensor readings comprises a three-dimensional spatial orientation data.

8. The computer-implemented method of claim 1, further comprising calculating an orientation of the computerized system using an attitude and heading reference system (AHRS) algorithm performed on at least some of the plurality of sensor readings.

9. The computer-implemented method of claim 1, wherein the plurality of sensors are incorporated into an inertial measurement unit (IMU).

10. The computer-implemented method of claim 1, wherein continuously executing the particle filter comprises performing a motion update, performing a measurement update and resampling a plurality of particles.

11. The computer-implemented method of claim 10, wherein performing the measurement update comprises calculating a distance between each of a second plurality of particles and at least one localization signal source based on the received localization signal.

12. The computer-implemented method of claim 10, wherein performing the measurement update comprises updating a plurality of particles using a confidence of a classifier.

13. The computer-implemented method of claim 10, wherein resampling the plurality of particles comprises calculating a weight for each of a plurality of particles and replicating particles of the plurality of particles with higher weights.

14. The computer-implemented method of claim 1, wherein determining the location of the at least one new localization signal source comprises using prior information on locations of at least some of the plurality of localization signal sources.

15. The computer-implemented method of claim 1, wherein the smoothened trajectory data is representative of movement trajectory of the computerized system, and wherein generating a smoothened trajectory data for the computerized system comprises smoothening the plurality of sensor readings from the plurality of sensors using a median filter.

16. The computer-implemented method of claim 1, wherein the bias parameters for the plurality of sensors compensates for time-varying bias of the plurality of sensor readings obtained using the plurality of sensors, wherein the bias parameters are updated, in part, using the map of locations of the first plurality of localization signal sources.

17. A non-transitory computer-readable medium embodying a set of computer-executable instructions, which, when executed in connection with a system comprising a central processing unit, a Bluetooth localization signal receiver, a plurality of sensors, separate and distinct from the Bluetooth localization signal receiver, and a memory, cause the system to perform a method comprising:

a. obtaining a map comprising locations of a first plurality of localization signal sources;
b. receiving a plurality of localization signals corresponding to a second plurality of localization signal sources using the localization signal receiver, the second plurality of localization signal sources comprising the first plurality of localization signal sources and at least one new localization signal source;
c. obtaining a plurality of sensor readings using the plurality of sensors; and
d. determining a location of the at least one new localization signal source using the map of locations of the first plurality of localization signal sources, the received localization signals of the second plurality of localization signal sources, and the obtained plurality of sensor readings,
wherein the determining the location of the at least one new localization signal source comprises continuously executing a particle filter, continuously dynamically updating bias parameters for the plurality of sensors and the location of each of the second plurality of localization signal sources, and generating a smoothened trajectory data for the computerized system.

18. A computerized system comprising a central processing unit, a Bluetooth localization signal receiver, a plurality of sensors, separate and distinct from the Bluetooth localization signal receiver, and a memory, the memory storing a set of computer-readable instructions causing the system to perform a method comprising:
a. obtaining a map comprising locations of a first plurality of localization signal sources;
b. receiving a plurality of localization signals corresponding to a second plurality of localization signal sources using the localization signal receiver, the second plurality of localization signal sources comprising the first plurality of localization signal sources and at least one new localization signal source;
c. obtaining a plurality of sensor readings using the plurality of sensors; and
d. determining a location of the at least one new localization signal source using the map of locations of the first plurality of localization signal sources, the received localization signals of the second plurality of localization signal sources, and the obtained plurality of sensor readings,
wherein the determining the location of the at least one new localization signal source comprises continuously executing a particle filter, continuously dynamically updating bias parameters for the plurality of sensors and the location of each of the second plurality of localization signal sources, and generating a smoothened trajectory data for the computerized system.

19. The computerized system of claim 18, wherein the localization signal receiver is a Bluetooth receiver and wherein the localization signal sources are Bluetooth low energy (BLE) beacons.

20. The computerized system of claim 18, wherein the localization signal receiver is a radiofrequency receiver and wherein the localization signal sources are radiofrequency sources.

* * * * *